C. H. LOOMIS.
SCHOOL DESK.
No. 4,190. Reissued Nov. 29, 1870.
Fig:1.
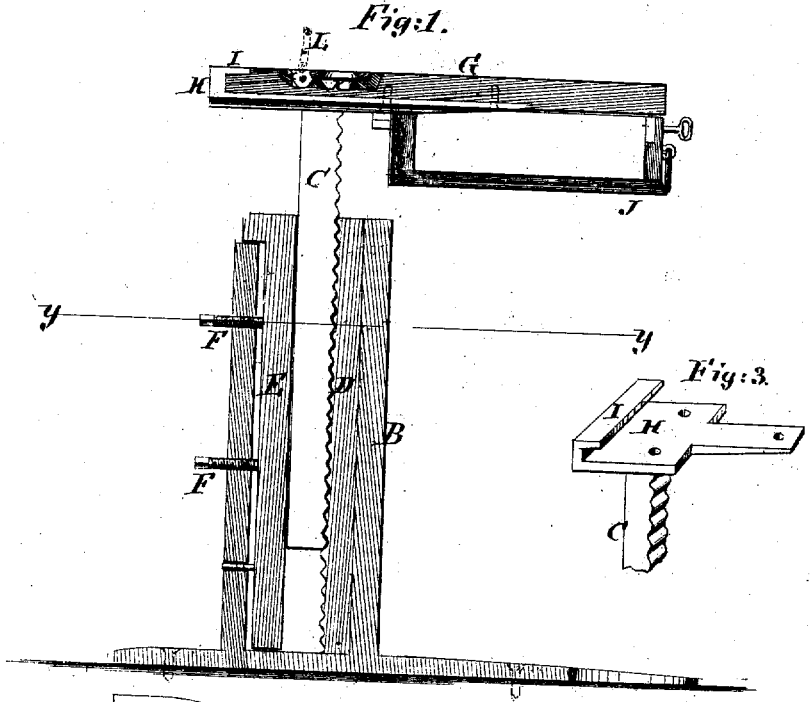
Fig:3.
Fig:2
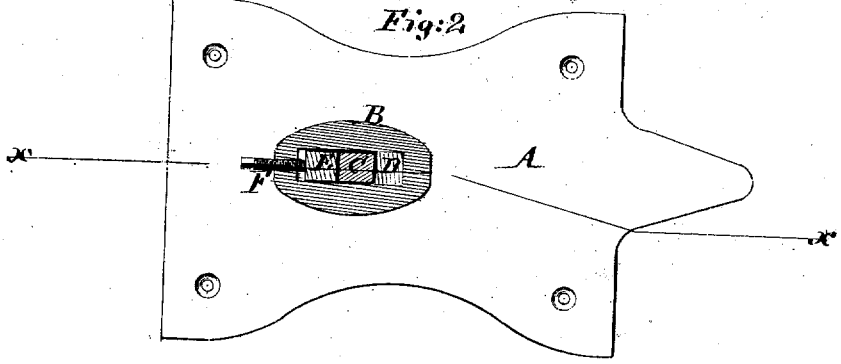
Witnesses:
M. Vorlaender
Geo. N. Mabee
Inventor:
C. H. Loomis
Per Munn & Co.
Attorneys.

United States Patent Office.

CHARLES H. LOOMIS OF NEW PHILADELPHIA, OHIO.

Letters Patent No. 104,472, dated June 21, 1870; reissue No. 4,190, dated November 29, 1870.

IMPROVEMENT IN SCHOOL-DESKS.

The Schedule referred to in these Letters Patent and making part of the same.

*To all whom it may concern:*

Be it known that I, CHARLES H. LOOMIS, of New Philadelphia, in the county of Tuscarawas and State of Ohio, have invented a new and useful Improvement in Adjustable School-Desks; and I do hereby declare that the following is a full, clear, and exact description thereof, which will enable others skilled in the art to make and use the same, reference being had to the accompanying drawing forming part of this specification.

The object of this invention is to so construct school-desks, tables, and similar articles that they may be adjusted as to height to suit persons of different ages, whether in a sitting or standing position; and It consists in the construction, arrangement, and combination of parts, as hereinafter more fully described.

In the accompanying drawing—

Figure 1 represents a vertical section of fig. 2 on the line *x x*.

Figure 2 is a horizontal section of fig. 1, taken on the line *y y*, looking down.

Figure 3 is a detail view of the adjusting-bar.

Similar letters of reference indicate corresponding parts.

A is a bed-plate, which, with the pedestal B, is cast in a single piece, but which may be made in separate pieces and fastened to the floor by screws or otherwise, as may be found most convenient.

The pedestal or pillow B is tubular in this example of my invention, but it may be in any suitable form for supporting the adjusting-bar in the desired position.

C is the adjusting-bar. This bar may be serrated upon one of its sides, as represented, or it may be smooth, and either square, flat, round, or of other form in cross-section.

A serrated strip, D, may be employed to engage with the serrated side of the bar, if desired, and a strip, E, may be employed at the back of the bar C, as represented in the drawing, should this mode be preferred; but I do not confine myself to this or any other particular arrangement for regulating or adjusting the desk or table to the proper height.

F represents screws, one or more, which work in screw-threads through the pedestal for holding the bar in the required position, but this may be accomplished by a pin or key, or by any mechanical device suitable for the purpose.

G is the desk or table-top.

H is a plate, which is cast on or attached rigidly to the top of the adjusting-bar.

The desk or table is fastened to this plate, as seen in fig. 1.

Its back edge is supported by the projecting lip I of the plate, where it is held by screws or otherwise, as seen in the drawing.

J is a drawer under the top.

K is a recess for an inkstand.

L is a clasp, which is hinged to the recess for holding the inkstand in place.

By this arrangement it will be seen that the desk or table is adapted for various purposes, but is more especially designed for the school-room.

Having thus described my invention,

I claim as new and desire to secure by Letters Patent—

1. The top G of a school-desk, provided with the recess K and clamp L, to receive and hold an inkstand, as described.

2. The combination, with a desk-top, G, of the lipped plate H I, supported on a vertically-adjustable bar, C, as described.

3. The vertically-adjustable bar C, combined, as described, with laterally-adjustable bar E and tubular stand B, for the purpose described.

CHARLES H. LOOMIS.

Witnesses:

W. S. NEELY,

W. A. HILTON.